United States Patent
Li

(10) Patent No.: US 11,611,244 B2
(45) Date of Patent: Mar. 21, 2023

(54) MOBILE TERMINAL, CHARGING DEVICE FOR WIRELESSLY CHARGING THE MOBILE TERMINAL AND CHARGING METHOD THEREOF

(71) Applicant: VIVO MOBILE COMMUNICATION CO., LTD., Guangdong (CN)

(72) Inventor: Dahuan Li, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 140 days.

(21) Appl. No.: 16/980,338

(22) PCT Filed: Mar. 12, 2019

(86) PCT No.: PCT/CN2019/077803
§ 371 (c)(1),
(2) Date: Sep. 11, 2020

(87) PCT Pub. No.: WO2019/174569
PCT Pub. Date: Sep. 19, 2019

(65) Prior Publication Data
US 2021/0044127 A1 Feb. 11, 2021

(30) Foreign Application Priority Data
Mar. 16, 2018 (CN) .......................... 201810218745.3

(51) Int. Cl.
*H02J 7/00* (2006.01)
*H02J 50/80* (2016.01)
*H02J 50/10* (2016.01)

(52) U.S. Cl.
CPC .......... *H02J 50/80* (2016.02); *H02J 7/00045* (2020.01); *H02J 7/00712* (2020.01); *H02J 50/10* (2016.02)

(58) Field of Classification Search
CPC .................................................. H02J 7/00045
See application file for complete search history.

(56) References Cited

U.S. PATENT DOCUMENTS

| 2012/0178506 A1 | 7/2012 | Sorias et al. | |
| 2014/0139180 A1* | 5/2014 | Kim | H02J 50/80 |
| | | | 320/108 |

(Continued)

FOREIGN PATENT DOCUMENTS

| CN | 103296705 A | 9/2013 |
| CN | 103415977 A | 11/2013 |

(Continued)

OTHER PUBLICATIONS

EP Search Report in Application No. 19766499.8 dated Mar. 23, 2021.

(Continued)

*Primary Examiner* — Yalkew Fantu
(74) *Attorney, Agent, or Firm* — Maschoff Brennan

(57) ABSTRACT

The present disclosure provides a mobile terminal, a charging device and a charging method thereof. A first communication module is disposed in the mobile terminal and a second communication module is disposed in the charging device to perform match verification. After the match verification is successful, the mobile terminal may transmit a charging request including a charging parameter required by the mobile terminal to the charging device, and then receive first energy that matches the charging parameter and is transmitted by the charging device. After the mobile terminal converts the first energy into a direct current voltage for charging, the mobile terminal can directly use the direct current voltage corresponding to the first energy for charging.

15 Claims, 3 Drawing Sheets

(56) References Cited

U.S. PATENT DOCUMENTS

| | | | |
|---|---|---|---|
| 2016/0359340 A1* | 12/2016 | Zhao | H02J 7/007192 |
| 2017/0302097 A1* | 10/2017 | Kim | H02J 7/00036 |
| 2017/0331335 A1 | 11/2017 | Brooks et al. | |
| 2018/0048170 A1 | 2/2018 | Sun et al. | |
| 2019/0068005 A1 | 2/2019 | Wang et al. | |

FOREIGN PATENT DOCUMENTS

| | | |
|---|---|---|
| CN | 104416568 A | 3/2015 |
| CN | 104600796 A | 5/2015 |
| CN | 106253400 A | 12/2016 |
| CN | 106537719 A | 3/2017 |
| CN | 107332590 A | 11/2017 |
| CN | 107351716 A | 11/2017 |
| CN | 107769306 A | 3/2018 |
| CN | 108429364 A | 8/2018 |
| EP | 3 068 017 A2 | 9/2016 |

OTHER PUBLICATIONS

Chinese Search Report issued in corresponding application No. 201810218745.3, dated Nov. 19, 2018.
Chinese First Office Action issued in corresponding application No. 201810218745.3, dated Nov. 4, 2019.
Chinese Third Office Action issued in corresponding application No. 201810218745.3, dated Apr. 24, 2020.
International Search Report and Written Opinion issued in corresponding application No. PCT/CN2019/077803, dated Oct. 1, 2020.

\* cited by examiner

MOBILE TERMINAL, CHARGING DEVICE FOR WIRELESSLY CHARGING THE MOBILE TERMINAL AND CHARGING METHOD THEREOF

CROSS-REFERENCE TO RELATED APPLICATION

This application is the U.S. national phase of PCT Application PCT/CN2019/077803 filed on Mar. 12, 2019, which claims the benefit and priority of Chinese Application No. 201810218745.3, filed on Mar. 16, 2018, the disclosures of which are incorporated in their entirety by reference herein.

TECHNICAL FIELD

The present disclosure relates to the field of communications technology, and in particular to a mobile terminal, a charging device and a charging method thereof.

BACKGROUND

With development of science and technology, communications technology has developed rapidly and made great progress. With improvement of communications technology, mobile terminals have become an indispensable part of people's lives. With popularization of the mobile terminals, users have increasingly higher requirements for types of functions and performance of the mobile terminals, for example, internet functions, audio functions, shooting functions and quick charging functions have all become necessary functions for smart terminals or mobile terminals.

Wireless charging has gradually become a mainstream charging method. In the related art, the wireless charging is basically that a transmitter of a charger provides energy to an induction coil of a receiver of the mobile terminal, and then a battery of the mobile terminal can be charged after rectification, filtering and DC/DC conversion. In the wireless charging mode in the related art, due to a large energy loss during the DC/DC voltage conversion, there is a large energy loss between the receiver of mobile terminal and the battery, which limits the charging efficiency and causes the mobile terminal to heat up very quickly, easily resulting in hardware damage due to high temperature.

SUMMARY

Embodiments of the present disclosure provide a mobile terminal, a charging device and a charging method thereof, which can solve the problem that in the wireless charging mode in the related art, there is a large energy loss when the mobile terminal performs DC/DC voltage conversion, which affects the charging efficiency, and results in quickly heating up to a high temperature.

One embodiment of the present disclosure provides a mobile terminal. The mobile terminal includes:

a first communication module configured to communicate with a second communication module of a charging device for charging the mobile terminal, perform a match verification between the mobile terminal and the charging device, and when the match verification is successful, the first communication module configured to transmit a charging request to the charging device; wherein the charging request includes a charging parameter;

a receiving module configured to receive a first energy transmitted by the charging device, and convert the first energy into a first alternating voltage; wherein the first energy is generated by the charging device according to the charging parameter;

a conversion module electrically connected to the receiving module and configured to convert the first alternating current voltage into a first direct current voltage and output the first direct current voltage to a first charging module of the mobile terminal; and the first charging module configured to charge a battery of the mobile terminal by using the first direct current voltage.

One embodiment of the present disclosure further provides a charging device for charging a mobile terminal. The charging device includes:

a second communication module, configured to communicate with a first communication module of the mobile terminal, perform a match verification between the mobile terminal and the charging device, when the match verification is successful, and the second communication module configured to receive a charging request transmitted by the mobile terminal; wherein the charging request includes a charging parameter;

a power adjustment module electrically connected to the second communication module and configured to adjust, according to the charging parameter, an energy received by the charging device from a power source to a first energy which is to be transmitted; wherein the first energy matches the charging parameter;

a transmission module electrically connected to the power adjustment module and configured to transmit the first energy to the mobile terminal.

One embodiment of the present disclosure further provides a charging method, applied to a mobile terminal. The method includes:

establishing a communication connection with a charging device for charging the mobile terminal and performing a match verification;

when the match verification between the mobile terminal and the charging device is successful, transmitting a charging request to the charging device, wherein the charging request includes a charging parameter;

receiving a first energy transmitted by the charging device, and converting the first energy into a first alternating current voltage, wherein the first energy is generated by the charging device according to the charging parameter;

converting the first alternating current voltage into a first direct current voltage;

charging a battery of the mobile terminal by using the first direct current voltage.

One embodiment of the present disclosure further provides a charging method, applied to a charging device for charging a mobile terminal. The method includes:

establishing a communication connection with the mobile terminal and performing a match verification;

when the match verification between the mobile terminal and the charging device is successful, receiving a charging request transmitted by the mobile terminal, wherein the charging request includes a charging parameter;

according to the charging parameter, adjusting an energy received by the charging device from a power source to a first energy which is to be transmitted, wherein the first energy matches the charging parameter;

transmitting the first energy to the mobile terminal.

In the mobile terminal, the charging device and the charging method thereof according to embodiments of the present disclosure, the first communication module is disposed in the mobile terminal and the second communication module is disposed in the charging device to perform match verification. After the match verification is successful, the mobile terminal may transmit a charging request including a charging parameter required by the mobile terminal to the charging device, and then receive first energy that matches the charging parameter and is transmitted by the charging device. After the mobile terminal converts the first energy into a direct current voltage for charging, the mobile terminal can directly use the direct current voltage corresponding to the first energy for charging. In this way, after receiving the first energy, the mobile terminal can directly use the direct current voltage corresponding to the first energy for charging without DC/DC voltage conversion, thereby effectively reducing the energy loss caused by the DC/DC voltage conversion, preventing the temperature from rising, reducing the temperature of the mobile terminal during charging and improving the charging efficiency.

BRIEF DESCRIPTION OF THE DRAWINGS

In order to explain the technical solutions of the embodiments of the present disclosure more clearly, the drawings used in the description of the embodiments of the present disclosure are briefly introduced below. Obviously, the drawings in the following description are just some embodiments of the present disclosure. For those of ordinary skill in the art, other drawings can be obtained based on these drawings without creative labor.

DETAILED DESCRIPTION

The technical solutions in the embodiments of the present disclosure are clearly and completely described hereinafter with reference to the accompanying drawings in the embodiments of the present disclosure. Apparently, the described embodiments are a part of the embodiments of the present disclosure, but not all of the embodiments. All other embodiments obtained by those skilled in the art based on the embodiments of the present disclosure without creative labor are within the scope of the present disclosure.

Figure 1:
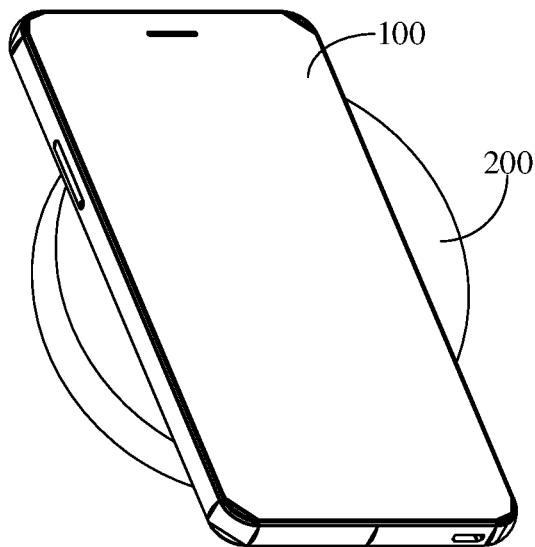
FIG. 1 is a schematic diagram of wireless charging according to an embodiment of the present disclosure.

Referring to FIG. 1, FIG. 1 is a schematic diagram of wireless charging according to an embodiment of the present disclosure. As shown in FIG. 1, the present disclosure provides a mobile terminal 100 and a charging device 200. The charging device 200 is configured to wirelessly charge the mobile terminal 100.

The charging device 200 is configured to wirelessly charge the mobile terminal 100 in such a manner that the mobile terminal 100 and the charging device 200 may perform wireless energy transmission through electric field or magnetic field coupling, such as electric field induction, magnetic induction, magnetic resonance or wireless radiation mode, which are not limited thereto.

Figure 2:
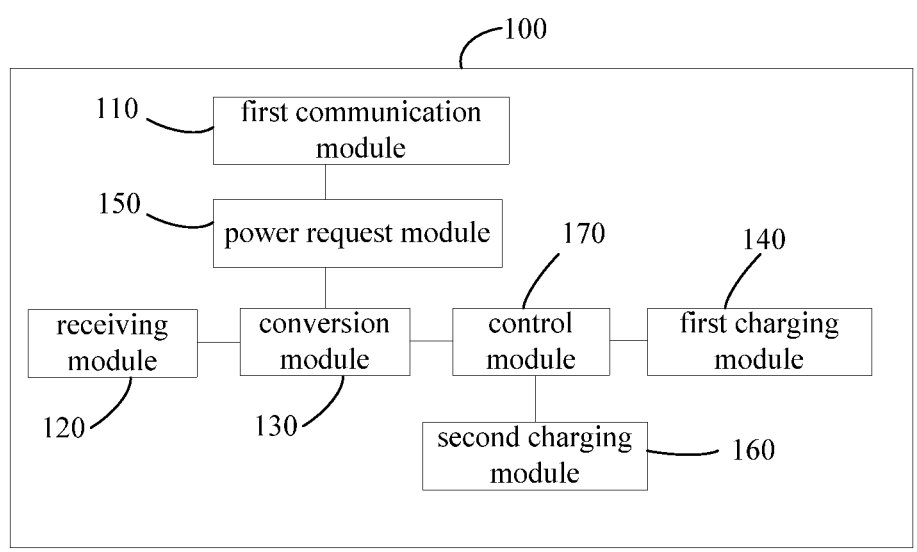
FIG. 2 is a schematic structural diagram of a mobile terminal shown in FIG. 1.

Referring also to FIG. 2, FIG. 2 is a schematic structural diagram of the mobile terminal shown in FIG. 1. As shown in FIG. 2, the mobile terminal 100 includes a first communication module 110, a receiving module 120, a conversion module 130, and a first charging module 140. The receiving module 120 is electrically connected to the conversion module 130. The first charging module 140 is electrically connected to the conversion module 130. The first communication module 110 is electrically connected to the conversion module 130.

The first communication module 110 is configured to communicate with a second communication module 210 (shown in FIG. 4) of the charging device 200 that charges the mobile terminal 100, so that the mobile terminal 100 and the charging device 200 performs match verification to verify whether the mobile terminal 100 and the charging device 200 are matched devices or original equipment, or the like.

When the match verification between the mobile terminal 100 and the charging device 200 is successful, i.e., the mobile terminal 100 and the charging device 200 are matched devices or original equipment, the mobile terminal 100 may transmit a charging request for charging to the charging device 200 through the first communication module 110. The charging request includes a charging parameter. The charging parameter is a parameter corresponding to a charging voltage required when charging a battery of the mobile terminal 100.

In one embodiment, the charging parameter may include a charging power, but is not limited thereto. In other embodiments, in addition to the charging power, the charging parameter may further include parameters such as a charging voltage and a charging current.

A communication protocol for communication connection between the first communication module 110 and the second communication module 210 may use encrypted communication protocol or a protocol that provides output voltage, such as a quick charge protocol, etc., when the mobile terminal 100 and the charging device 200 are standard matched devices or original equipment. The communication protocol for communication connection between the first communication module 110 and the second communication module 210 may also use a common wireless charging WPC communication protocol, when the mobile terminal 100 and the charging device 200 are not matched devices or original equipment.

The communication connection mode of the first communication module 110 and the second communication module 210 may include, but not limited to, any one or a combination of bluetooth, wireless fidelity (Wireless-Fidelity, WiFi), Zigbee protocol (Zigbee), radio frequency identification technology (Radio Frequency Identification, RFID), long range (LongRange, Lora) wireless technology, near field communication (Near Field Communication, NFC).

The receiving module 120 is configured to receive a first energy transmitted by the charging device 200, and convert the first energy into a first alternating voltage (AC). The first energy is generated by the charging device 200 according to the charging parameter.

The receiving module 120 may be a receiving antenna mainly composed of an inductor and a capacitor, such as a receiving coil.

The conversion module 130 is electrically connected to the receiving module 120, and is configured to convert the first alternating current voltage into a first direct current (DC) voltage, and output the first direct current voltage to the first charging module 140 of the mobile terminal 100.

The first charging module 140 is configured to charge the battery of the mobile terminal 100 by using the first direct current voltage.

The first charging module 140 may charge the battery of the mobile terminal 100 in a low-voltage and high-current charging mode or a high-voltage and high-current charging mode, i.e., charging the battery by series charging and parallel discharging with reduction voltage.

Figure 3:
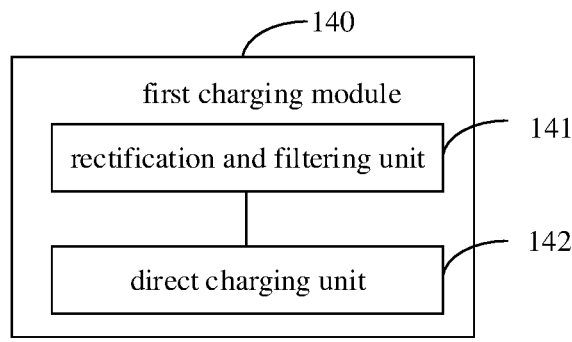
FIG. 3 is a schematic structural diagram of a first charging module shown in FIG. 1.

Further, referring also to FIG. 3, FIG. 3 is a schematic structural diagram of the first charging module shown in FIG. 1. The first charging module 140 includes a rectification and filtering unit 141 and a direct charging unit 142. The rectification and filtering unit 141 is electrically connected to the conversion module 130. The direct charging unit 142 is electrically connected to the rectification and filtering unit 141.

The rectification and filtering unit 141 is configured to perform rectification and filtering processing on the first direct current voltage.

The direct charging unit 142 is configured to charge the battery of the mobile terminal 100 by using the rectified and filtered first direct current voltage.

In this way, the battery is the only one heat source in an entire charging path for the battery, and the loss of the charging path is only the line impedance loss on the charging path. The first charging module directly uses the direct current voltage corresponding to the first energy for charging, without DC/DC voltage conversion, thereby effectively reducing the energy loss caused by the DC/DC voltage conversion, preventing the temperature from rising, reducing the temperature of the mobile terminal during charging and improving the charging efficiency.

The mobile terminal 100 further includes a power request module 150. The power request module 150 is electrically connected to the conversion module 130 and the first communication module 110, respectively. The first communication module 110 is electrically connected to the conversion module 130 through the power request module 150.

The power request module 150 is configured to, when the match verification between the mobile terminal 100 and the charging device 200 is successful, transmit the charging parameter of the charging request to the first communication module 110.

Further, the power request module 150 may further monitor the conversion module 130 to monitor whether the first direct current voltage obtained by the conversion module 130 via conversion is stable and correct.

When the first direct current voltage fluctuates or is different from the charging voltage required by the battery of the mobile terminal 100, an instruction may be transmitted to the first communication module 110, and then, through communication between the first communication module 110 and the second communication module 210, the first energy transmitted by the charging device 200 is adjusted.

The mobile terminal 100 further includes a second charging module 160. The second charging module 160 is electrically connected to the conversion module 130.

Further, the receiving module 120 is further configured to, when the match verification between the mobile terminal 100 and the charging device 200 is unsuccessful, receive second energy transmitted by the charging device 200 and convert the second energy into a second alternating current voltage, where the second energy is generated by the charging device 200 according to a preset transmission parameter.

In one embodiment, the transmission parameter may include but is not limited to, a transmission power. In other embodiments, in addition to the transmission power, the transmission parameter may further include parameters such as a transmission voltage and a transmission current.

Correspondingly, the conversion module 130 is further configured to convert the second alternating current voltage into a second direct current voltage, and output the second direct current voltage to the second charging module.

The second charging module 160 is configured to convert the second direct current voltage into a charging voltage matched with the charging parameter, for charging the battery of the mobile terminal 100.

The second charging module 160 may include a voltage conversion unit, a filter unit and a charging unit. The voltage conversion unit converts the second direct current voltage into the charging voltage matched with the charging parameter. The filter unit performs filtering process on the charging voltage obtained via conversion. The charging unit charges the battery of the mobile terminal 100 by using the filtered charging voltage.

The voltage conversion unit may be a voltage conversion circuit or a DC/DC voltage conversion circuit composed of a PMI voltage conversion chip.

In this way, when the match verification between the mobile terminal and the charging device is unsuccessful, i.e., the mobile terminal and the charging device are not matched devices or original equipment, the mobile terminal can still receive the second energy transmitted by the charging device, thereby performing common wireless charging.

The mobile terminal 100 further includes a control module 170. The control module 170 is electrically connected to the conversion module 130, the first charging module 140 and the second charging module 160, respectively. The first charging module 140 is electrically connected to the conversion module 130 through the control module 170. The second charging module 160 is electrically connected to the conversion module 130 through the control module 170.

The control module 170 is configured to, when the match verification between the mobile terminal 100 and the charging device 200 is successful, control conduction between the conversion module 130 and the first charging module 140, thereby enabling the conversion module 130 to transmit the first alternating current voltage to the first charging module 140.

Alternatively, the control module 170 is further configured to, when the match verification between the mobile terminal 100 and the charging device 200 is unsuccessful, control conduction between the conversion module 130 and the second charging module 160, thereby enabling the conversion module 130 to transmit the second alternating current voltage to the second charging module 160.

In this way, by the presence of the control module, dedicated wireless charging for the matched devices or common wireless charging may be selected according to a result of the match verification between the mobile terminal and the charging device.

In one embodiment of the present disclosure, the mobile terminal 100 may be any mobile terminal having a wireless charging function, such as a mobile phone, a tablet personal computer (Tablet Personal Computer), a laptop computer (Laptop Computer), or a personal digital assistant (personal digital assistant, PDA), mobile internet device (Mobile Internet Device, MID) or wearable device (Wearable Device).

Figure 4:
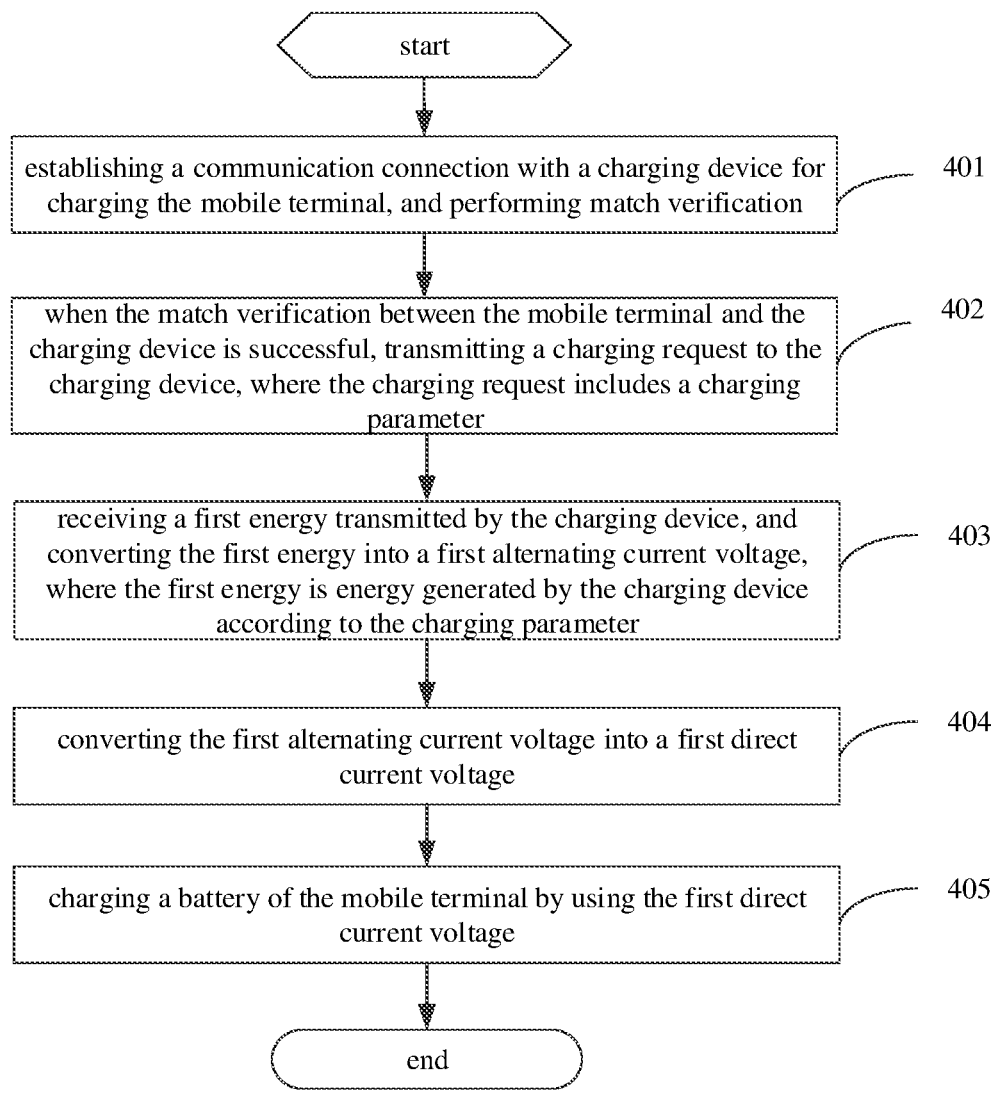
FIG. 4 is a flow chart of a charging method according to an embodiment of the present disclosure.

Correspondingly, referring to FIG. 4, FIG. 4 is a flow chart of a charging method according to an embodiment of the present disclosure. One embodiment of the present disclosure further provides a charging method applied to the foregoing mobile terminal 100. The method includes steps 401 to 405.

Step 401: establishing a communication connection with a charging device for charging the mobile terminal, and performing match verification.

In this step, the mobile terminal 100 is in communication connection with the charging device 200 for charging the mobile terminal 100, and then match verification is performed to verify whether the mobile terminal 100 and the charging device 200 are matched devices or original equipment, or the like.

The communication connection between the mobile terminal 100 and the charging device 200 may be a communication connection between the first communication module 110 of the mobile terminal 100 and the second communication module 210 of the charging device 200.

Step 402: when the match verification between the mobile terminal and the charging device is successful, transmitting a charging request to the charging device, where the charging request includes a charging parameter.

In this step, after performing the match verification between the mobile terminal 100 and the charging device 200, when the match verification between the mobile terminal 100 and the charging device 200 is successful, the mobile terminal 100 may transmit the charging request to the charging device 200.

The charging request includes a charging parameter. The charging parameter is a parameter corresponding to a charging voltage required when charging a battery of the mobile terminal 100.

Step 403: receiving a first energy transmitted by the charging device, and converting the first energy into a first alternating current voltage, where the first energy is generated by the charging device according to the charging parameter.

In this step, the mobile terminal 100 may receive the first energy transmitted by the charging device 200. After receiving the first energy, the mobile terminal 100 may convert the first energy into the first alternating current voltage.

The first energy is generated by the charging device according to the charging parameter.

Step 404: converting the first alternating current voltage into a first direct current voltage.

In this step, after the mobile terminal 100 obtains the first alternating current voltage via conversion, the mobile terminal 100 may convert the first alternating current voltage into the first direct current voltage which can be directly used by the mobile terminal 100.

Step 405: charging a battery of the mobile terminal by using the first direct current voltage.

In this step, after the mobile terminal 100 obtains the first direct current voltage via conversion, the first direct current voltage may be directly used to charge the battery of the mobile terminal 100.

Optionally, after the step 401, the method includes:

when the match verification between the mobile terminal and the charging device is unsuccessful, receiving second energy transmitted by the charging device and converting the second energy into a second alternating current voltage, where the second energy is generated by the charging device according to a preset transmission parameter.

In this step, after performing the match verification between the mobile terminal 100 and the charging device 200, when the match verification between the mobile terminal 100 and the charging device 200 is unsuccessful, the mobile terminal 100 may receive the second energy transmitted by the charging device 200. After receiving the second energy, the mobile terminal 100 converts the second energy into the second alternating current voltage.

The second energy is generated by the charging device 200 according to the preset transmission parameter.

Further, the method further includes: converting the second alternating current voltage into a second direct current voltage.

In this step, after the mobile terminal 100 converts the received second energy into the second alternating current voltage, the mobile terminal 100 may convert the second alternating current voltage into the second direct current voltage for convenient use.

Further, the method further includes: converting the second direct current voltage into a charging voltage matched with the charging parameter, for charging the battery of the mobile terminal.

In this step, after the mobile terminal 100 converts the second alternating current voltage into the second direct current voltage, in order to be usable, the mobile terminal 100 needs to perform a voltage reduction process on the second direct current voltage before the second direct current voltage can be used for charging. Therefore, the mobile terminal 100 converts the second direct current voltage into a charging voltage that can charge the battery of the mobile terminal 100 to charge the battery of the mobile terminal 100.

The charging voltage is a voltage that matches the charging parameter.

Conversion of the second direct current voltage into the charging voltage may be implemented in a way that a voltage conversion circuit or a DC/DC voltage conversion circuit composed of a PMI voltage conversion chip performs voltage conversion processing such as voltage reduction process on the second direct current voltage.

Optionally, the step 405 includes:

performing rectification and filtering processing on the first direct current voltage; and charging the battery of the mobile terminal by the first direct current voltage which is rectified and filtered.

In this step, after the mobile terminal 100 obtains the first direct current voltage via conversion, the mobile terminal 100 may first perform rectification and filtering processing on the first direct current voltage to maintain stability of the first direct current voltage. Then, the rectified and filtered first direct current voltage is used to charge the battery of the mobile terminal.

In this way, the mobile terminal may perform match verification with the charging device through the communication module. After the match verification is successful, the mobile terminal transmits the charging request including the charging parameter. After receiving the first energy matching the charging parameter, the mobile terminal can directly use the direct current voltage corresponding to the first energy for charging without DC/DC voltage conversion, thereby effectively reducing the energy loss caused by the DC/DC voltage conversion, preventing the temperature from rising, reducing the temperature of the mobile terminal during charging and improving the charging efficiency.

Figure 5:
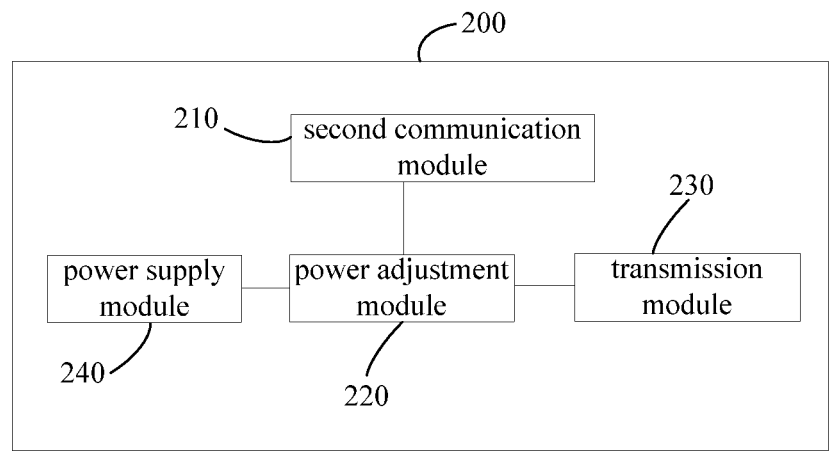
FIG. 5 is a schematic structural diagram of a charging device shown in FIG. 1.

Referring also to FIG. 5, FIG. 5 is a schematic structural diagram of the charging device shown in FIG. 1. As shown in FIG. 5, the charging device 200 includes a second communication module 210, a power adjustment module 220, a transmission module 230 and a power supply module 240. The power adjustment module 220 is electrically connected to the second communication module 210, the power supply module 240 and the transmission module 230, respectively.

The second communication module 210 is configured to communicate with the first communication module 110 of the mobile terminal 100, so that the mobile terminal 100 and the charging device 200 performs match verification to verify whether the mobile terminal 100 and the charging device 200 are matched devices or original equipment, or the like.

When the match verification between the mobile terminal 100 and the charging device 200 is successful, i.e., the mobile terminal 100 and the charging device 200 are matched devices or original equipment, the charging device 200 may receive, through the second communication module 210, the charging request for charging transmitted by the mobile terminal 100. The charging request includes a charging parameter. The charging parameter is a parameter matching a charging voltage required when charging a battery of the mobile terminal 100.

In one embodiment, the charging parameter may include a charging power, but is not limited thereto. In other embodiments, in addition to the charging power, the charging parameter may further include parameters such as a charging voltage and a charging current.

A communication protocol for communication connection between the first communication module 110 and the second communication module 210 may use encrypted communication protocol or a protocol that provides output voltage, such as a quick charge protocol, etc., when the mobile terminal 100 and the charging device 200 are standard matched devices or original equipment. The communication protocol for communication connection between the first communication module 110 and the second communication module 210 may also use a common wireless charging WPC communication protocol, when the mobile terminal 100 and the charging device 200 are not matched devices or original equipment.

The communication connection mode of the first communication module 110 and the second communication module 210 may include, but not limited to, any one or a combination of bluetooth, wireless fidelity (Wireless-Fidelity, WiFi), Zigbee protocol (Zigbee), radio frequency identification technology (Radio Frequency Identification, RFID), long range (LongRange, Lora) wireless technology, near field communication (Near Field Communication, NFC).

The power adjustment module 220 is configured to, after the charging device 200 receives the charging request through the second communication module 210, according to the charging parameter in the charging request, adjust an energy received by the charging device from a power source, thereby adjusting the energy received from the power source to a first energy which is to be transmitted.

The first energy matches the charging parameter.

The transmission module 230 is configured to transmit the first energy to the mobile terminal 100.

The power supply module 240 is configured to obtain energy from the power source for the charging device 200.

Further, the power adjustment module 220 is further configured to, when authentication between the mobile terminal and the charging device is unsuccessful, i.e., the mobile terminal 100 and the charging device 200 are not matched devices or original equipment, according to a preset transmission parameter of the charging device 200, adjust the energy received by the charging device from the power source, thereby adjusting the energy received from the power source to a second energy which is to be transmitted.

In one embodiment, the transmission parameter may include a transmission power, but is not limited thereto. In other embodiments, in addition to the transmission power, the transmission parameter may further include parameters such as a transmission voltage and a transmission current.

The second energy is matched with the preset transmission parameter of the charging device.

Correspondingly, the transmission module 230 is further configured to transmit the second energy to the mobile terminal.

Figure 6:
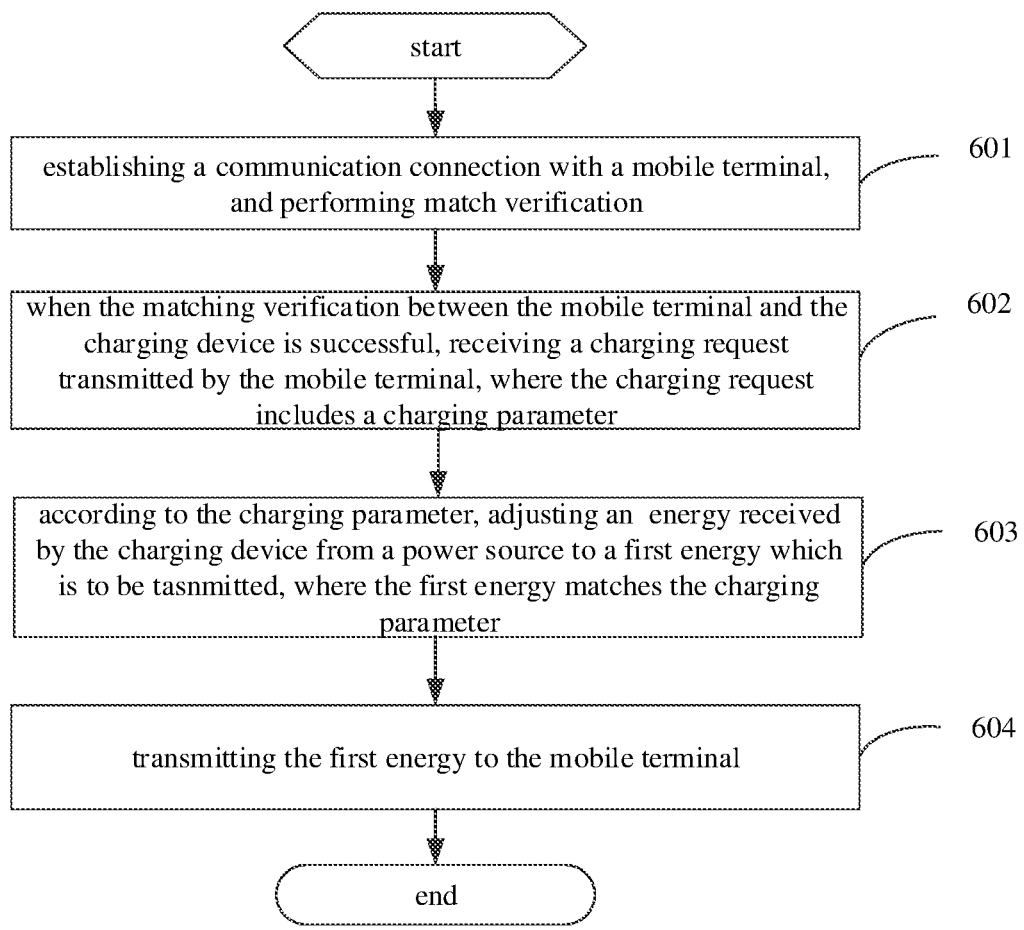
FIG. 6 is another flow chart of a charging method according to an embodiment of the present disclosure.

Correspondingly, referring to FIG. 6, FIG. 6 is another flow chart of a charging method according to an embodiment of the present disclosure. One embodiment of the present disclosure further provides a charging method, which is applied to the foregoing charging device 200. The method includes steps 601 to 604.

Step 601: establishing a communication connection with a mobile terminal, and performing match verification.

In this step, the charging device 200 is in communication connection with the mobile terminal 100 which is a charging target, and then match verification is performed to verify whether the mobile terminal 100 and the charging device 200 are matched devices or original equipment, or the like.

The communication connection between the mobile terminal 100 and the charging device 200 may be a communication connection between the first communication module 110 of the mobile terminal 100 and the second communication module 210 of the charging device 200.

Step 602: when the match verification between the mobile terminal and the charging device is successful, receiving a charging request transmitted by the mobile terminal, where the charging request includes a charging parameter.

In this step, when the match verification between the charging device 200 and the mobile terminal 100 is successful, the charging device 200 may receive, through the second communication module 210, the charging request transmitted by the mobile terminal 100.

The charging request includes the charging parameter.

Step 603: according to the charging parameter, adjusting an energy received by the charging device from a power source to a first energy which is to be transmitted, where the first energy matches the charging parameter.

In this step, after the charging device 200 receives the charging request, the charging device 200 may adjust the energy received by the charging device 200 from the power source according to the charging parameter in the charging request, thereby adjusting the energy to a first energy which is to be transmitted and which matches the charging parameter.

Step 604: transmitting the first energy to the mobile terminal.

In this step, after the charging device 200 obtains the first energy via adjustment, the charging device 200 can transmit the first energy to the mobile terminal 100.

Optionally, after the step 601, the method includes:

when authentication between the mobile terminal and the charging device is unsuccessful, according to the preset transmission parameter of the charging device, adjusting the energy received by the charging device from the power source to a second energy which is to be transmitted, where the second energy is matched with the preset transmission parameter of the charging device; and, transmitting the second energy to the mobile terminal.

In this step, after performing the match verification between the charging device 200 and the mobile terminal 100, when the match verification between the charging device 200 and the mobile terminal 100 is unsuccessful, i.e., the mobile terminal 100 and the charging device 200 are not matched devices or original equipment, according to the preset transmission parameter of the charging device 200, the charging device 200 adjusts the energy received by the charging device from the power source, thereby adjusting the energy received from the power source to a second energy which is to be transmitted and which is matched with the preset transmission parameter of the charging device, and transmitting the second energy to the mobile terminal 100.

In the mobile terminal, the charging device and the charging method thereof according to the embodiments of the present disclosure, the first communication module is disposed in the mobile terminal and the second communication module is disposed in the charging device to perform match verification. After the match verification is successful, the mobile terminal may transmit a charging request including the charging parameter required by the mobile terminal to the charging device, and then receive the first energy that matches the charging parameter and is transmitted by the charging device. After the mobile terminal converts the first energy into a direct current voltage for charging, the mobile terminal can directly use the direct current voltage corresponding to the first energy for charging. In this way, after receiving the first energy, the mobile terminal can directly use the direct current voltage corresponding to the first energy for charging without DC/DC voltage conversion, thereby effectively reducing the energy loss caused by the DC/DC voltage conversion, preventing the temperature from rising, reducing the temperature of the mobile terminal during charging and improving the charging efficiency.

The embodiments of the present disclosure are described above with reference to the accompanying drawings, but the present disclosure is not limited to the specific embodiments described above. The specific embodiments described above are merely illustrative and not restrictive. In view of the present disclosure, a person skilled in the art may make modifications without departing from the principle of the present disclosure, and these modifications shall also fall within the scope of the present disclosure.

What is claimed is:

1. A mobile terminal, comprises:
   a first communication module configured to communicate with a second communication module of a charging device for charging the mobile terminal, perform a match verification between the mobile terminal and the charging device, when the match verification is successful, the first communication module configured to transmit a charging request to the charging device; wherein the charging request comprises a charging parameter; and the charging parameter is a parameter corresponding to a charging voltage required when charging a battery of the mobile terminal; wherein the match verification comprises verifying whether the mobile terminal and the charging device are matched devices or original equipment;
   a receiving module configured to receive a first energy transmitted by the charging device, and convert the first energy into a first alternating voltage; wherein the first energy is generated by the charging device according to the charging parameter;
   a conversion module electrically connected to the receiving module and configured to convert the first alternating current voltage into a first direct current voltage and output the first direct current voltage to a first charging module of the mobile terminal; and
   the first charging module configured to charge a battery of the mobile terminal by using the first direct current voltage;
   wherein the mobile terminal further comprises a second charging module;
   wherein the receiving module is further configured to receive a second energy transmitted by the charging device and convert the second energy into a second alternating current voltage when the match verification between the mobile terminal and the charging device is unsuccessful; the second energy is generated by the charging device according to a preset transmission parameter;
   the conversion module is further configured to convert the second alternating current voltage into a second direct current voltage, and output the second direct current voltage to the second charging module;
   the second charging module is configured to convert the second direct current voltage into a charging voltage matched with the charging parameter, for charging the battery of the mobile terminal;
   wherein the mobile terminal further comprises:
   a power request module electrically connected to the first communication module, when the match verification between the mobile terminal and the charging device is successful, the power request module configured to transmit the charging parameter of the charging request to the first communication module;
   wherein the power request module is further configured to monitor the conversion module to monitor whether the first direct current voltage obtained by the conversion module via conversion is stable and correct when the first direct current voltage fluctuates or is different from the charging voltage required by the battery of the mobile terminal, the power request module is further configured to transmit an instruction to the first communication module to adjust the first energy transmitted by the charging device through communication between the first communication module and the second communication module.

2. The mobile terminal according to claim 1, further comprising a switch control module; wherein the switch control module is electrically connected to the conversion module, the first charging module and the second charging module, respectively;
   wherein the switch control module is configured to control conduction between the conversion module and the first charging module when the match verification between the mobile terminal and the charging device is successful, thereby enabling the conversion module to transmit the first alternating current voltage to the first charging module; or,
   the switch control module is configured to, when the match verification between the mobile terminal and the charging device is unsuccessful, control conduction between the conversion module and the second charging module, thereby enabling the conversion module to transmit the second alternating current voltage to the second charging module.

3. The mobile terminal according to claim 1, wherein the first charging module comprises:
   a rectification and filtering unit electrically connected to the conversion module and configured to perform rectification and filtering processing on the first direct current voltage; and a direct charging unit configured to charge the battery of the mobile terminal by the first direct current voltage which is rectified and filtered.

4. The mobile terminal according to claim 1, wherein the second charging module comprises a voltage conversion unit, a filter unit and a charging unit;
the voltage conversion unit is configured to convert the second direct current voltage into the charging voltage matched with the charging parameter;
the filter unit is configured to perform filtering process on the charging voltage obtained via conversion;
the charging unit is configured to charge the battery of the mobile terminal by the charging voltage which is filtered.

5. The mobile terminal according to claim 1, wherein the charging parameter comprises at least one of a charging power, a charging voltage and a charging current.

6. The mobile terminal according to claim 1, wherein the transmission parameter comprises at least one of a transmission power, a transmission voltage and a transmission current.

7. A charging device for charging a mobile terminal, comprising:
a second communication module, configured to communicate with a first communication module of the mobile terminal, perform a match verification between the mobile terminal and the charging device, when the match verification is successful, the second communication module configured to receive a charging request transmitted by the mobile terminal; wherein the charging request comprises a charging parameter; and the charging parameter is a parameter corresponding to a charging voltage required when charging a battery of the mobile terminal; wherein the match verification comprises verifying whether the mobile terminal and the charging device are matched devices or original equipment;
a power adjustment module electrically connected to the second communication module and configured to adjust, according to the charging parameter, an energy received by the charging device from a power source to the first energy which is to be transmitted; wherein the first energy matches the charging parameter;
a transmission module electrically connected to the power adjustment module and configured to transmit the first energy to the mobile terminal;
wherein the power adjustment module is further configured to, when the match verification between the mobile terminal and the charging device is unsuccessful, according to a preset transmission parameter of the charging device, adjust the energy received by the charging device from the power source to a second energy which is to be transmitted; the second energy matches the preset transmission parameter of the charging device;
the transmission module is further configured to transmit the second energy to the mobile terminal;
wherein the second communication module is further configured to receive, from the first communication module, an instruction for adjusting the first energy;
the power adjustment module is further configured to, receive the instruction for adjusting the first energy from the second communication module, and adjust the first energy according to the instruction for adjusting the first energy.

8. A charging method, applied to the charging device according to claim 7, comprising:
establishing a communication connection with the mobile terminal and performing a match verification; wherein the match verification comprises verifying whether the mobile terminal and the charging device are matched devices or original equipment;
when the match verification between the mobile terminal and the charging device is successful, receiving a charging request transmitted by the mobile terminal, wherein the charging request comprises a charging parameter; wherein the charging parameter is a parameter corresponding to a charging voltage required when charging a battery of the mobile terminal;
according to the charging parameter, adjusting an energy received by the charging device from a power source to a first energy which is to be transmitted, wherein the first energy matches the charging parameter;
transmitting the first energy to the mobile terminal;
wherein after the establishing a communication connection with the mobile terminal and performing a match verification, the method further comprises:
when the match verification between the mobile terminal and the charging device is unsuccessful, according to a preset transmission parameter of the charging device, adjusting the energy received by the charging device from the power source to a second energy which is to be transmitted, wherein the second energy is matched with the preset transmission parameter of the charging device; and,
transmitting the second energy to the mobile terminal;
wherein the method further comprises:
receiving an instruction for adjusting the first energy from the mobile terminal; and
adjusting the first energy according to the instruction for adjusting the first energy.

9. The charging method according to claim 8, wherein the charging parameter comprises at least one of a charging power, a charging voltage and a charging current; the transmission parameter comprises at least one of a transmission power, a transmission voltage and a transmission current.

10. The charging device according to claim 7, wherein the charging parameter comprises at least one of a charging power, a charging voltage and a charging current.

11. The charging device according to claim 7, wherein the transmission parameter comprises at least one of a transmission power, a transmission voltage and a transmission current.

12. A charging method, applied to a mobile terminal, comprising:
establishing a communication connection with a charging device for charging the mobile terminal and performing a match verification; wherein the match verification comprises verifying whether the mobile terminal and the charging device are matched devices or original equipment;
when the match verification between the mobile terminal and the charging device is successful, transmitting a charging request to the charging device, wherein the charging request comprises a charging parameter; wherein the charging parameter is a parameter corresponding to a charging voltage required when charging a battery of the mobile terminal;
receiving a first energy transmitted by the charging device, and converting the first energy into a first alternating current voltage, wherein the first energy is generated by the charging device according to the charging parameter;

converting the first alternating current voltage into a first direct current voltage;

charging a battery of the mobile terminal by using the first direct current voltage;

wherein after the establishing a communication connection with a charging device for charging the mobile terminal and performing a match verification, the method further comprises:

when the match verification between the mobile terminal and the charging device is unsuccessful, receiving a second energy transmitted by the charging device and converting the second energy into a second alternating current voltage, wherein the second energy is generated by the charging device according to a preset transmission parameter;

converting the second alternating current voltage into a second direct current voltage;

converting the second direct current voltage into a charging voltage matched with the charging parameter, for charging the battery of the mobile terminal;

wherein the method further comprises:

when the match verification between the mobile terminal and the charging device is successful, transmitting the charging parameter of the charging request to the first communication module of the mobile terminal;

monitoring whether the first direct current voltage obtained via conversion is stable and correct when the first direct current voltage fluctuates or is different from the charging voltage required by the battery of the mobile terminal, transmitting an instruction for adjusting the first energy transmitted by the charging device, to the charging device through communication between the first communication module and the charging device.

13. The charging method according to claim 12, wherein the charging a battery of the mobile terminal by using the first direct current voltage, comprises:

performing rectification and filtering processing on the first direct current voltage; and charging the battery of the mobile terminal by the first direct current voltage which is rectified and filtered.

14. The charging method according to claim 12, wherein the charging parameter comprises at least one of a charging power, a charging voltage and a charging current.

15. The charging method according to claim 12, wherein the transmission parameter comprises at least one of a transmission power, a transmission voltage and a transmission current.

* * * * *